March 12, 1946. A. H. VITAGLIANO 2,396,400

RADIATOR VALVE

Filed March 31, 1944

INVENTOR.
Albert H. Vitagliano
BY
Ezekiel Wolf
his Attorney

Patented Mar. 12, 1946

2,396,400

UNITED STATES PATENT OFFICE 2,396,400

RADIATOR VALVE

Albert H. Vitagliano, Everett, Mass.

Application March 31, 1944, Serial No. 528,938

1 Claim. (Cl. 236—66)

The present invention relates to improvements in steam radiator valves of the type which are used in steam heating radiators, boilers and other steam systems in which it is desired to permit the air which may be in the steam system to be driven out or prevent air from working back into the system when the steam pressure has dropped.

The present invention employs two valves in an arrangement in which one of the valves will close when the steam pressure drops and the other valve when the steam pressure rises. In the construction of the present invention the valve which closes upon the rise in steam pressure is operated and controlled by means of a simple thermostatic spring element, one end of which is supported in the element in which the valve stem is journalled and the other end of which works in a collar in the valve stem to actuate it in the desired direction.

The present invention has the further advantage that it has few elements and may be readily assembled and further that the parts are held in position in such a manner that merely by shaking or turning, no damage can be done to the valve.

With the use of a float valve, as contemplated in the present arrangement, the valve should be used in an upwardly projecting position but other than this, however, the valve may function in any position.

The invention will be more fully described in the specification set forth below when taken in connection with the drawing showing an embodiment of the same in which.

Figure 1:
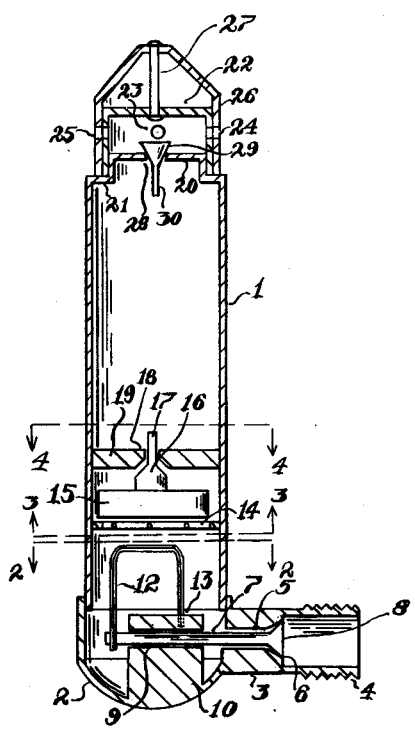
Figure 1 shows a vertical sectional elevation through the invention.
Figure 2:
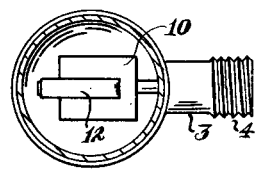
Figure 2 shows a section taken substantially on the line 2—2 of Figure 1.
Figure 4:
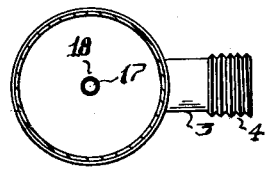
Figure 4 shows a section taken substantially on the line 4—4 of Figure 1.
Figure 3:
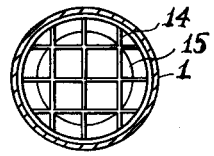
Figure 3 shows a section taken substantially on the line 3—3 of Figure 1.
Figure 5:
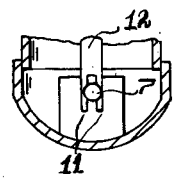
Figure 5 shows a view of the detail shown in Figure 1.

In the drawing I indicates a housing or casing for the steam valve, which housing may be of metal or plastic or any composition capable of withstanding the temperatures and the moisture which the device may be subjected to. The casing I may be cylindrical or any shape suitable with an opening at the bottom which fits into a cup-shaped support 2 at one side of which is an extending cylindrical member 3 having a threaded cylindrical pipe outlet 4 by which the valve may be screwed into the radiator. The cylindrical member 3 may have a centrally located hole 5 which ends in a tapered valve seat 6 at the pipe outlet 4. A valve stem 7 with a conical head or end 8 is positioned in the hole 5 so that the conical valve head 8 may rest upon the tapered seat 6 and form a good closure when the stem is in a closed position. The stem 7 is supported for a sliding fit in a hole 9 in the block 10. This hole 9 is aligned with the hole 5 so that the stem 7 may slide back and forth to seat or unseat the valve closure 8 on the surface of the valve seat. The valve stem 7 is provided with a collar in which the forked ends 11 of a bi-metallic thermostat element 12 is positioned. This bi-metallic thermostat element is bent up and around in the form of an inverted "U" and the other end of it is securely fastened into the top of the block 10 at the point 13. While the bi-metallic thermostat element is shown substantially in the shape of an inverted U, or semicircular it may have an arcuate shape or other useful shape, it being arranged in such a manner that when the steam enters through the pipe opening 4 into the valve chamber, the bi-metallic element will expand in such a manner as to shut the valve by pulling the stem 7 to the left, as viewed in Figure 1.

It will be noted that the bi-metallic element is normally in such a position under ordinary temperatures that the valve head 8 is held away from the seat 6 and when the temperature decreases again to normal or lower than normal, the bi-metallic element will assume the position indicated in Figure 1.

Positioned in the cylinder I above the bi-metallic element 12 is a grid support 14 upon which rests a float 15 carrying a float valve 16. This float valve 16 is provided with a conical surface and an upwardly projecting stem 17 passing through an opening 18 in the valve seat element 19 which is rigidly supported in the casing I to its inside wall in a horizontal position. The support 19 on its lower face has a conical seat which fits the conical seat of the valve 16 so that when the float 15 is raised as, for instance, when water enters the lower portion of the valve, then the float will lift and no water will be permitted to escape through the radiator valve to the outside as, for instance, the floor or room in which the radiator is situated. This is an emergency provision which is useful in the event that the radiators become filled with water, which sometimes happens in careless operation after the radiators have cooled down.

The vacuum valve of the system is positioned in the top of the radiator valve. The casing I for this purpose is closed at the top in a closure 20, at the top of the casing. An upwardly projecting shoulder 21 is provided between the top closure 20 and the cylindrical portion of the valve, which shoulder provides support for the cover members for the vacuum valve.

In this arrangement there is provided an inner cylindrical vessel 22 fitting closely against the upwardly projecting wall of the shoulder 21. This cylindrical cover is provided with openings 23, 24, 25 at its sides which extend also through the outer cylindrical cover 26 which has an axis concentric with the inner cover 22. The two covers are held together through a pin 27 concentrically located with respect to both covers. These two covers are held together in such a way that the outer one may turn around, if desired, to align the inner and outer holes for the escape of air or steam. If desired, the inner cover 22 may be made fast to the vertical extension of the shoulder 21 by welding or any other suitable manner. The top cover 20 across the main cylinder of the valve is provided with a conical opening 28 in which is positioned a conical valve member 29 having a stem 30 extending downward through the opening 28. The stem 30 is long enough so that if the valve should be turned around so that it would rest against the top portion of the cover 22, it would still extend through the hole 28 so that it could not be thrown out of its position.

In the arrangement as described, after the steam pressure has diminished, the steam within the valve chamber 1 will condense and pressure lower than atmospheric pressure will be present within the chamber of the valve 1. Under these conditions the valve 29 will be forced down against the seat 28 and the vacuum within the valve 1 will be substantially maintained. However, after a time this vacuum will leak out through neutralization and leaks in other parts of the system so that probably before steam is again supplied to the radiators, the chamber within the housing 1 will be filled with air. Under these conditions when pressure is again built up and steam enters the cylinder 1, the air will be forced out through the opening 28 and pass out through the holes 23, 24, 25 at the top of the radiator valve. These may be shut off, if desired, when steam goes out but this will in the main be unnecessary since when steam pressure has entered with the chamber 1, the valve 8 will shut off the further flow of steam through the radiator valve whereupon vacuum will again be created and the valves, for the time being, will remain closed.

The action of the float valve has already been explained. This will go into operation when water rises in the system and in this case the valve 8 may or may not be closed, depending upon the temperature at which the water enters. For the most part, however, since the water will be below the temperature of the steam, the valve will usually be opened.

This improved steam radiator valve is practical and efficient and will operate within the range for which the system may be used. It may be made to operate to close the outlet vents at a comparatively low pressure since the operation is entirely controlled through temperature means. If the action of the thermostat is such as to operate below the temperature of the steam, then the valve may be made to close when the steam has only a few ounces of pressure.

Having now described my invention, I claim:

A steam radiator valve comprising a casing having a radiator inlet pipe at the bottom thereof, a thermostat steam valve positioned therein adapted to close with the admission of steam therein, a grid support positioned above said valve in said casing, a float valve resting, when not buoyant, on said support, said float being shaped like said casing section but free to move in a direction longitudinal with said casing, a closure positioned directly above said float extending across said casing and having a valve seat therein, said float member having a valve stem element adapted to fit against said seat with a stem projecting through said opening, said support and float being positioned sufficiently close to said closure so that said stem cannot fall out of normal position, and an air intake check valve at the top of said casing with a member checking the influx of air in said radiator valve, said air intake check valve comprising a closure at the top of said casing having an opening with a valve seat therein, and a valve member fitting in said seat with the stem thereof projecting through said opening and a cover over said valve member positioned sufficiently close thereto to prevent said member from coming out of the opening.

ALBERT H. VITAGLIANO.